July 1, 1958     A. A. HOUSER     2,840,913

SCALE HOLDER FOR OPTICAL TOOLING

Filed Aug. 30, 1956     2 Sheets-Sheet 1

ALFRED A. HOUSER
*INVENTOR.*

BY *Duane C. Bowen*

ATTORNEY

July 1, 1958     A. A. HOUSER     2,840,913
SCALE HOLDER FOR OPTICAL TOOLING

Filed Aug. 30, 1956     2 Sheets-Sheet 2

ALFRED A. HOUSER
INVENTOR.

BY *Duane C. Bowen*

ATTORNEY

United States Patent Office 2,840,913
Patented July 1, 1958

2,840,913

SCALE HOLDER FOR OPTICAL TOOLING

Alfred A. Houser, Wichita, Kans., assignor to Boeing Airplane Company, Wichita, Kans., a corporation of Delaware Application August 30, 1956, Serial No. 607,216

5 Claims. (Cl. 33—74)

This invention relates to a scale holder and, more particularly, to a device for orienting a white faced scale relative a tooling button and an optical instrument in optical tooling. Briefly, the structure includes a first member clamping on a tooling button and a second member supporting a scale and subject to pivotal adjustment relative the tooling button while maintaining contact between the scale and tooling button.

Tooling buttons are used as reference points on a large variety of master gages, final assembly jigs, facility gages, etc., in large tooling and production manufacture. In the aircraft industry, the buttons may represent locations of station, buttock and water line positions. The tooling buttons are very accurately machined and positioned. A wide variety of optical instruments are used to sight the tooling buttons such as transits, alignment telescopes, levels and squares.

It has been common in the past for a first man to hold a white faced scale manually to the tooling button and to orient it with a separate level. A second man sighted the scale while it was being so manually held. Many errors appeared because of incorrect positioning of the scales by hand and the procedure was wasteful of time. Optical tooling has become important because of its time saving and its increased accuracy. However, the optical readings could not be more accurate than the scale placement and holding.

The objectives of my invention include, therefore: to provide mechanical means for holding a scale to a tooling button, in selected position, to save time and increase accuracy in optical tooling, to provide integral means for leveling the scale, to devise means for pivoting the scale about its axis while maintaining contact with a tooling button to permit readings on a line of sight which otherwise would lie in the plane of the scale, and to provide such a structure with fine accuracy of positioning, ease of operation by a single man, and economy of manufacture.

My invention will be best understood, together with additional objectives and advantages thereof, from a reading of the following description, read with reference to the drawings in which.

Figure 1:
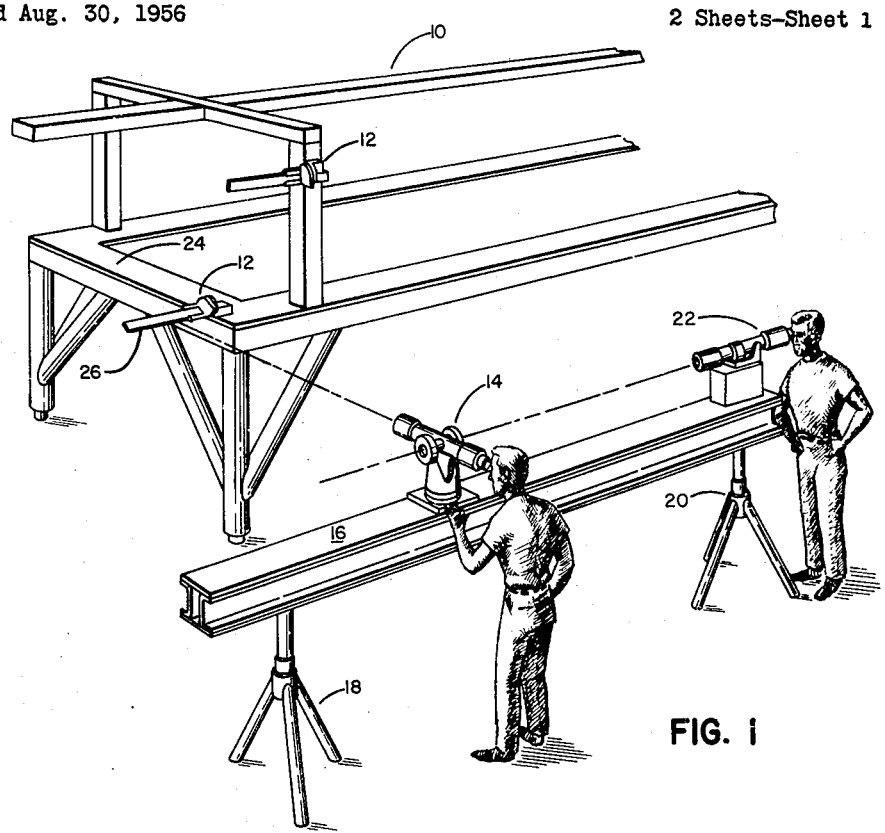
Figure 1 is a perspective view, in fragmentary form, showing the use of a specific embodiment of my invention.

Figure 1 shows the use of my invention in a typical application. A final assembly jig 10 is briefly indicated and scale holders 12 are located on tooling buttons on the jig. The scales are being read with an optical square 14 mounted on a tooling bar 16. Associated equipment is shown, including tooling bar stands 18, 20 and an alignment telescope 22. My invention is applicable to the use of my scale holder on a variety of jigs and gages having tooling buttons, which are sighted with various types of optical instruments.

Figure 2:
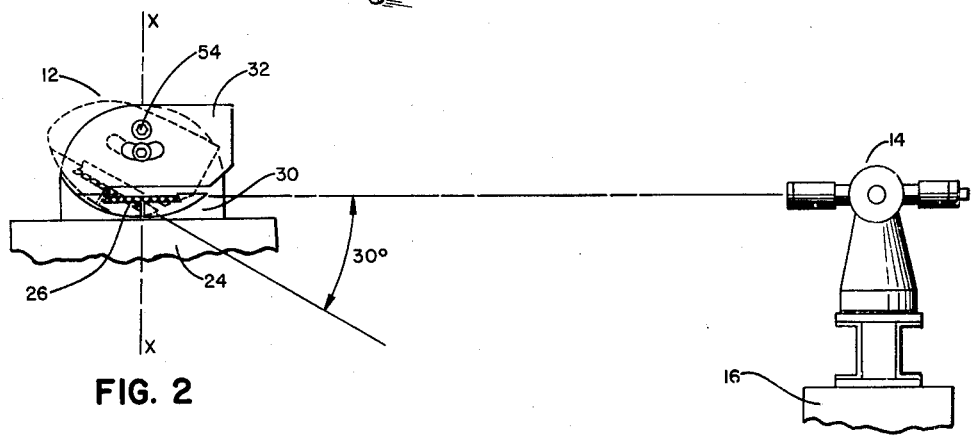
Figure 2 is a side elevation showing schematically the pivotal adjustment of the scale relative the line of sight of an optical instrument.
Figure 3:
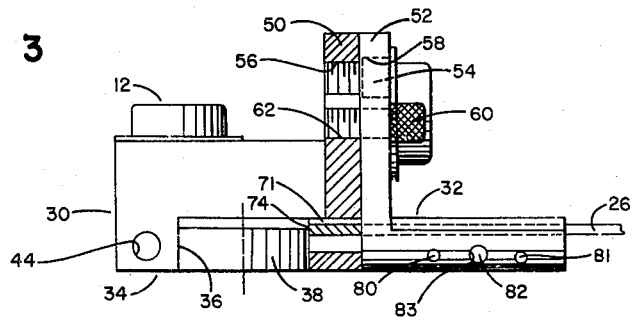
Figure 3 is a side view on enlarged scale and partially in section.
Figure 4:
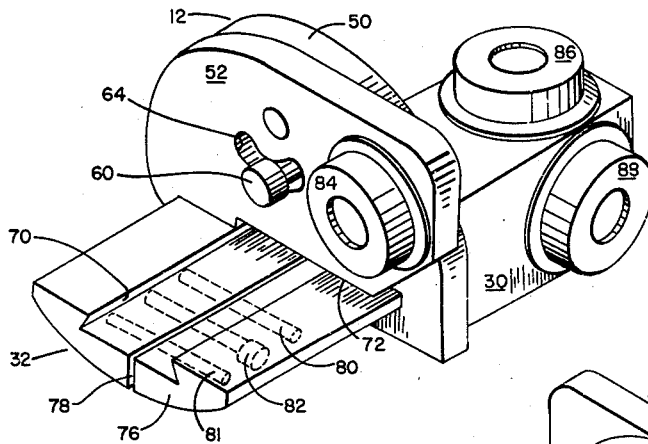
Figure 4 is an enlarged perspective view.
Figure 5:
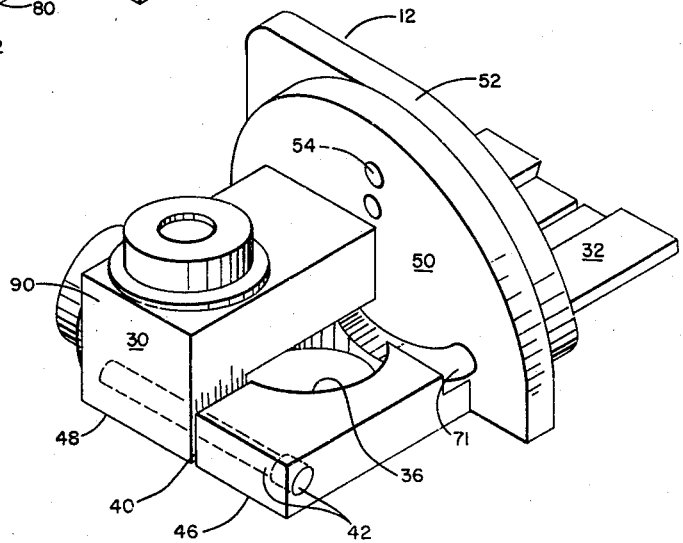
Figure 5 is a perspective view taken oppositely to Figure 4.

Figure 2 shows the use of scale holder 12 as applied to a tooling button, secured to a structural part 24 of the jig 10 of Figure 1. The tooling button has an axis x—x normal to the surface of structural member 24. The line of sight of optical square 14 would lie in the plane of scale 26 if the scale were not pivotally adjustable. As indicated by dotted lines, scale 26 is pivoted through an arc of about 30 degrees, which is sufficient to permit reading of the scale by square 14.

Scale holder 12 has two principal components, a clamp member 30 and a support member 32. Clamp member 30 has in its lower flat face 34 a tooling button opening 36 of a size to receive a tooling button 38. Clamp member 30 is split at 40 and a clamp bolt 42 is positioned in an opening 44 passing through one split portion 46 and threadedly engaged with bolt 42 in the second split portion 48, whereby tooling button 38 is clamped upon tightening of bolt 42.

Clamp member 30 has an upright wall 50 which abuts against an upright wall 52 on support member 32. Walls 50, 52 are pivotally connected by a bolt 54 threaded into an opening 56 in wall 50 and rotatedly mounted in a larger counterbored opening 58 in wall 52. The axis of bolt 54 is substantially normal to the axis of tooling button opening 36.

A manually operable clamping bolt 60 is threaded into an opening 62 in wall 50 and is slidably received in an arcuate slot 64 in wall 52. By operation of clamping bolt 60, support member 32 and scale 26 thereon are adjusted in position relative clamp member 30. Preferably, this pivotal adjustment is through an angle of 30 degrees at each side of center. As shown in Figure 2, this means that the minimum angle between the line of sight and the plane of the scale will be 30 degrees in most relative locations of optical instruments and tooling buttons and the scale can be easily read. The tooling buttons are usually positioned for convenient work and if the location of the tooling button were higher than the normal position of the optical instrument, then the tooling button would be on the underside. Scale holder 12 can be used as shown or inverted or can be used on a vertical surface in position extending from the tooling button down, up, to the right or to the left.

Support member 32 has a dovetailed slot 70 in its upper surface which supports scale 26 with its longitudinal axis normal to the axis of the tooling button opening 36. Walls 50, 52 have slots 71, 72 therethrough so that the inner end 74 of the white faced scale 26 is located to abut against the adjacent surface of tooling button 38 in all pivotal positions of the scale. To accommodate the pivoting of scale 26, slot 71 is arcuate.

Means is provided to clamp scale 26 in position by separating portion 76 of support member 32 from the remainder and by slidably mounting portion 76. This leaves a gap 78 which may be varied in width as scale 26 is clamped. Portion 76 is slidably mounted on a pair of dowels 80, 81 and a bolt 82 passes therethrough and threads into a threaded opening 83 in the remaining portion. Adjustment of bolt 82 adjustably clamps scale 26 against the opposite wall of guideway 70.

A single man can accomplish optical tooling with my scale holder. He would first accurately position one or more scale holders 12 and the associated scales 26 and then take the sights. It is desirable to locate the scale aligned with the horizontal or vertical and this is accomplished in most positions by the use of the integral bubble levels 84, 86, 88. Three bubble levels are shown but more or less, up to the six possible positions, could be used depending upon the required versatility of the holder. A raised pad 90 is formed on the upright surface of clamp member 30 to provide bearings for bubble levels 86, 88 as shown. If the scale holder is used on rare occasion with a tool button having an improperly aligned axis or mounted on a surface not perpendicular to the axis, means may be provided to pivotally adjust the orientation of the scale axis, as by shims placed in tooling button opening 36 or between plates 50, 52. A level will indicate the necessary adjustment.

My scale holder meets required tolerances as to positioning of the scales. The scale holder can be used singly or in combination and by one or more men. Time is saved and accuracy is increased over prior practices.

Having thus disclosed my invention, I do not wish to be limited to the precise details of construction as shown, but instead wish to cover those modifications thereof which will occur to those skilled in the art from my disclosure, and which fairly fall within the scope of my invention, as defined in the appended claims.

I claim:

1. A device for positioning a scale relative a tooling button and an optical instrument in optical tooling, comprising: a clamp member having a tooling button opening extending at right angles from a lower flat face thereof and of a size to receive a tooling button and said clamp member being split from said opening to an edge thereof and having a clamping bolt through the split portion operative to clamp such tooling button in said opening, said clamp member having a wall upstanding from an edge thereof and a support member having a wall upstanding from an edge thereof abutting said wall on said clamp member and a pivot bolt extending through said upstanding walls for pivoting therebetween about an axis normal to the axis of said tooling button opening, a clamping bolt supported in one upstanding wall and acting in an arcuate slot in the other upstanding wall for securing thereof in adjusted pivoted position, said support member having a support portion with a dovetail guideway and a flat elongated scale disposed therein in a position with its axis parallel to and spaced from said pivotal axis and normal to said tooling button opening axis, said support member and said clamp member having aligned slots therein at the end of said guideway intersecting said tooling button opening so that said scale may be abutted against clamped tooling buttons in all positions thereof and the aligned slot in said clamp member being arcuate to permit pivotal adjustment of said scale with said support member, and a series of bubble levels mounted on said device for orienting said scale relative the horizontal and vertical in various positions thereof.

2. A device for positioning a scale relative a tooling button and an optical instrument in optical tooling, comprising: a clamp member having a tooling button opening extending at right angles from a lower flat face thereof and of a size to receive a tooling button and said clamp member being split from said opening to an edge thereof and having a clamping bolt through the split portion operative to clamp such tooling button in said opening, said clamp member having a wall at an edge thereof and a support member having a wall abutting said wall on said clamp member and a pivot bolt connecting said walls for pivoting therebetween about an axis normal to the axis of said tooling button opening, said support member having a support portion with a guideway and a flat elongated scale disposed therein in a position with its axis normal to said tooling button opening axis, said support member and said clamp member having aligned slots therein at the end of said guideway intersecting said tooling button opening so that said scale may be abutted against clamped tooling buttons in all positions thereof and the aligned slot in said clamp member being larger than said scale to permit pivotal adjustment of said scale with said support member.

3. A device for positioning a scale relative a tooling button and an optical instrument in optical tooling, comprising: a clamp member having a tooling button opening in a face thereof of a size to receive a tooling button and having means operative to secure such tooling button therein, an elongated scale, a scale support member secured to said clamp member and mounted for pivotal movement about an axis normal to the axis of said tooling button opening, said support member having clamp means operable to support said elongated scale thereon in a position with its axis parallel to and spaced from said pivotal axis and normal to said tooling button opening axis, said support member and said clamp member having aligned openings therein at one end of said clamp means and the aligned opening in said clamp member intersecting said tooling button opening so that said scale may be abutted against a tooling button in said tooling button opening in all positions as said scale is pivoted with said support member to change its orienation.

4. A device for positioning a scale relative a tooling button and an optical instrument in optical tooling, comprising: a body having a clamp portion having a tooling button opening in a face thereof of a size to receive a tooling button and having clamp means operative to secure such tooling button therein, an elongated scale, said body having a scale support portion having securing means supporting said scale thereon in a position with its axis normal to said tooling button opening axis, said support and clamp portions being open from one end of said securing means to said tooling button opening and said scale thereby extending past the walls of said tooling button opening in position to be abutted against a tooling button in said tooling button opening, and bubble level means mounted on said body for orienting said scale relative the horizontal and vertical in various positions thereof.

5. A device for positioning a scale relative a tooling button and an optical instrument in optical tooling, comprising: a body having a securing portion having a tooling button opening in a face thereof of a size to receive a tooling button and having button securing means operative to secure such tooling button therein, an elongated scale, said body having a scale support portion having scale securing means supporting said elongated scale thereon in a position with its axis normal to said tooling button opening axis, said support and securing portions being open from one end of said scale securing means to said tooling button opening and said scale thereby extending past the walls of said tooling button opening in position to be abutted against a tooling button in said tooling button opening, and said securing portion and said support portion being divided and being secured together by pivotal means permitting pivoting of said support portion and scale about an axis normal to said tooling button opening axis to orient the face of the scale relative the line of sight of the optical instrument.

References Cited in the file of this patent

UNITED STATES PATENTS

| | | |
|---|---|---|
| 960,718 | Schtabe | June 7, 1910 |
| 1,199,355 | Edmiston | Sept. 26, 1916 |
| 1,324,681 | McDonald | Dec. 9, 1919 |
| 2,136,689 | Hughes et al. | Nov. 15, 1938 |
| 2,705,375 | Foreman et al. | Apr. 5, 1955 |